(12) United States Patent
Yang et al.

(10) Patent No.: US 9,893,628 B2
(45) Date of Patent: Feb. 13, 2018

(54) AC-DC POWER CONVERTERS WITH IMPROVED VOLTAGE OUTPUT LEVEL TRANSITIONS

(71) Applicant: Apple Inc., Cupertino, CA (US)

(72) Inventors: Zaohong Yang, Plano, TX (US); Behzad Mohtashemi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/064,395

(22) Filed: Mar. 8, 2016

(65) Prior Publication Data

US 2017/0126133 A1 May 4, 2017

Related U.S. Application Data

(60) Provisional application No. 62/248,849, filed on Oct. 30, 2015.

(51) Int. Cl.
*H02M 3/335* (2006.01)
*H02M 1/00* (2006.01)

(52) U.S. Cl.
CPC ... *H02M 3/33507* (2013.01); *H02M 3/33592* (2013.01); *H02M 3/33576* (2013.01); *H02M 2001/0067* (2013.01); *H02M 2001/0074* (2013.01); *H02M 2001/0077* (2013.01)

(58) Field of Classification Search
CPC .. H02M 3/1584; H02M 3/1588; H02M 3/285; H02M 3/22; H02M 3/33523; H02M 3/33561; H02M 3/33576; H02M 3/33592; H02M 2001/0067; H02M 2001/0074; H02M 2001/0077; H02M 2001/0093

USPC .......... 323/266; 363/15–16, 21.12
See application file for complete search history.

(56) References Cited

U.S. PATENT DOCUMENTS

| | | | | |
|---|---|---|---|---|
| 5,646,832 A | * | 7/1997 | Pulhamus, Jr. | H02M 1/4208 363/133 |
| 6,229,289 B1 | * | 5/2001 | Piovaccari | H02M 3/1588 323/268 |
| 6,388,432 B2 | * | 5/2002 | Uchida | G06F 1/324 323/266 |
| 7,508,177 B2 | * | 3/2009 | Aiura | H02M 1/44 323/268 |

(Continued)

*Primary Examiner* — Jeffrey Gblende
*Assistant Examiner* — Kyle J Moody
(74) *Attorney, Agent, or Firm* — Blank Rome LLP (57) ABSTRACT

This disclosure relates to power converters that are capable of providing smooth transitions between multiple output voltage levels. The converter's output may need to be changed from, e.g., 5V to 12V, 15V, or 20V—based on the charging device's request. By using improved power converter designs comprising both a flyback converter circuit and variable-frequency buck converter circuit that may each be selectively coupled to an output load, a more smooth, e.g., monotonous, transition between output voltage levels may be achieved. In particular, by varying the switching frequency of the buck converter in a controlled way, the output voltage of the power converter may rise monotonically during the transition between output voltage levels. According to some embodiments, once the output of the buck converter has reached its maximum value, the buck converter may be disabled, and the flyback converter may be enabled to begin supplying the output voltage to the load.

20 Claims, 10 Drawing Sheets

(56) References Cited

U.S. PATENT DOCUMENTS

| | | | |
|---|---|---|---|
| 8,248,044 B2* | 8/2012 | Brown | H02M 3/1588 |
| | | | 323/224 |
| 8,344,638 B2 | 1/2013 | Shteynberg | |
| 8,786,264 B2* | 7/2014 | Muhammad | H02M 3/1584 |
| | | | 323/269 |
| 8,908,391 B2* | 12/2014 | Odell | H02M 3/33561 |
| | | | 323/266 |
| 9,036,376 B2 | 5/2015 | Lawson | |
| 2003/0016545 A1* | 1/2003 | Jutras | H02M 3/1588 |
| | | | 363/18 |
| 2013/0201729 A1* | 8/2013 | Ahsanuzzaman | H02M 3/33507 |
| | | | 363/21.12 |
| 2014/0112029 A1 | 4/2014 | Lin | |
| 2015/0263625 A1* | 9/2015 | Lee | H02M 3/158 |
| | | | 323/271 |

\* cited by examiner

AC-DC POWER CONVERTERS WITH IMPROVED VOLTAGE OUTPUT LEVEL TRANSITIONS

TECHNICAL FIELD

This disclosure relates generally to power converters that are capable of providing monotonic transitions between multiple output voltage levels in an efficient manner. Other embodiments are also described herein.

BACKGROUND

Alternating current (AC) power is typically supplied from wall outlets and is sometimes referred to as line power or mains power. Electronic devices often include circuitry that runs from direct current (DC) power. AC to DC power converter circuitry can be used to convert AC power to DC power. The DC power may be used to power an electronic device that runs on DC power. The DC power may also be used to charge a battery in an electronic device.

AC to DC power converters often include transformers. A transformer in an AC to DC power converter may have primary and secondary windings. A pulse width modulation (PWM) circuit on the primary side of a transformer may generate pulses of current that pass through the primary winding of the transformer. On the secondary side of the transformer, a diode may be used to rectify the output of the secondary winding.

Some AC to DC power converter circuits use synchronous rectifier (SR) output stages. SR output stages may include one or more metal-oxide-semiconductor field-effect transistors (MOSFETs). The MOSFETs are driven so as to rectify the output waveform from the transformer in the same way that the diode is used in other power converter designs, while avoiding high diode voltage drops when conducting current (e.g., approximately 0.7V).

Certain power converter designs may have potential drawbacks. One drawback is that different electronic devices may have different voltage requirements, and a single power converter may not be able to satisfy all of the requirements of all the different devices. For instance, a laptop computer may require a higher amount of power during operation than the amount of power required by a mobile phone, e.g., a laptop could require two to three times the amount of power (or more) of a mobile phone. The power converter used to operate the mobile phone may not provide a sufficient amount of voltage to operate the laptop and the power converter used to operate the laptop may provide too much voltage and overpower the mobile phone.

To attempt to deal with some of these drawbacks, some power converters may employ a "tapped winding" transformer configuration. A tapped winding transformer refers to a transformer where the turns-ratio of the transformer may be adjusted to produce high and low output voltage ranges, as desired. However, such configurations can result in an overly complex circuit design, e.g., when two or more voltage output levels are required. Other power converters may employ a "hybrid" or "cascaded" converter design which, for example, may be comprised of a flyback converter followed by a DC/DC converter, such as a "buck converter" circuit or "boost converter" circuit that is configured to use an inductor, capacitor, and one or more switching devices to decrease or increase, respectively, an input voltage to a different output voltage level. However, such configurations can result in voltage transitions that are not smooth and monotonous, but instead may have discernable discontinuities.

SUMMARY

Power converters, e.g., flyback converters, with a wide range of potential output voltages may be applicable in a number of power conversion contexts. For example, they may be particularly applicable in the context of the USB-C standard. The USB-C industry standard is designed to be adaptable enough to be used for charging and data transfer to and from any device. Because a wider range of devices will soon support the USB-C standard, users will desire to use the same power adapter to charge all of their USB-C compatible devices. For power adapters designed to work with the USB-C standard, then, the flyback (or other) output of the power adapter may need to be changed over a wide range of output voltages, based on the charging device's request.

In fact, the newly-developed USB Power Delivery (USB-PD) standard requests that an AC-DC power converter be capable of providing a wide output voltage range (e.g., from 5V to 12V to 15V to 20V) from its USB output ports, in accordance with the system load requirements. The wide input voltage range (e.g., 90V to 265V) also makes it difficult to optimize the flyback converter design. Moreover, the output voltage is required to rise or fall monotonically, i.e., in either an entirely increasing or an entirely decreasing fashion, respectively. These smooth, monotonic transitions in output voltage show no discernable discontinuities.

Thus, described herein are various devices and methods for operating improved AC-DC power converters that are capable of providing smooth transitions between multiple output voltage levels. As mentioned above, the output voltage level of such improved converters may need to change from, e.g., 5V to 12V, 15V, or 20V—based on the charging device's request. By using the improved power converter designs disclosed herein, e.g., converters comprising both a flyback converter circuit and a variable-frequency buck converter circuit that may each be selectively coupled to an output load while operating at a particular frequency, monotonous transitions between output voltage levels may be achieved. In particular, by enabling and varying the switching frequency of the buck converter circuit in a controlled way, the output voltage of the power converter may rise (or fall) monotonically during the transition between output voltage levels.

According to some embodiments, during rising voltage transitions, output voltage is provided by the buck converter and the switching frequency of the buck converter may be decreased until the output of the buck converter has reached its maximum output voltage value, then the buck converter may be disabled, and the flyback converter may be enabled to begin supplying the higher output voltage to the load. Likewise, during falling voltage transitions, the flyback converter (which may have been initially providing the output voltage) may be disabled, and the buck converter may begin supplying the output voltage to the load at the maximum buck converter output voltage value, at which time the switching frequency of the buck converter may be increased until the output of the buck converter has reached the desired lower output voltage value.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above Summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness, a given figure may be used to illustrate the features of more than one embodiment of the invention, or more than one species of the invention, and not all elements in the figure may be required for a given embodiment or species.

DETAILED DESCRIPTION

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

Figure 1:
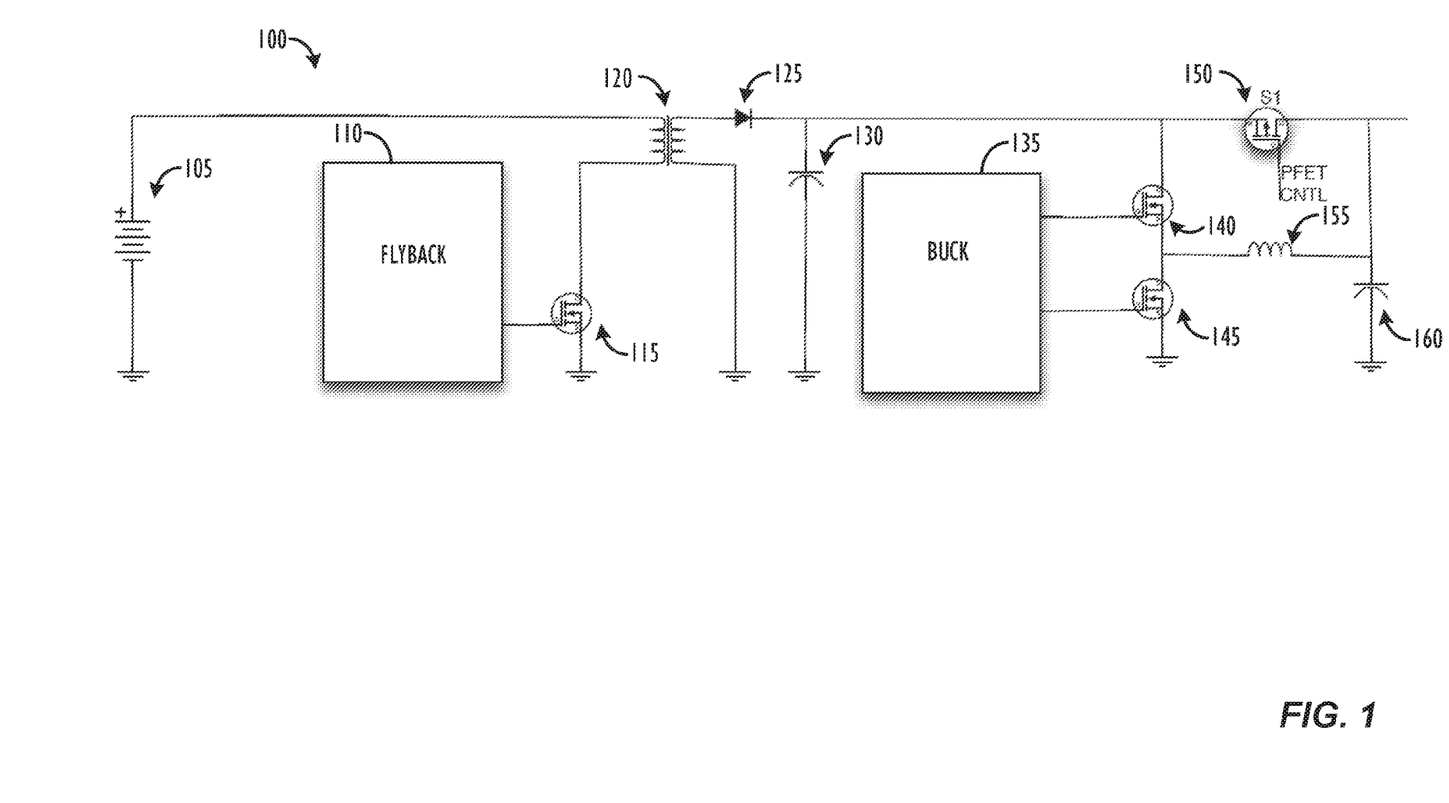
FIG. 1 illustrates a hybrid power converter circuit comprising a flyback converter and a buck converter according to some embodiments, in block diagram form.

Turning now to FIG. 1, a hybrid power converter circuit comprising a flyback converter and a buck converter 100 is illustrated in block diagram form, according to some embodiments. Power converter circuit 100 comprises power source 105 (which may, e.g., comprise a DC power source or a rectified AC power source), flyback controller circuit 110, switching mechanism 115, and transformer 120, which may comprise a primary and a secondary winding. Switching mechanism 115 may comprise a P-FET, N-FET, GaN FET, BJT transistor, or any other suitable power switch, for controlling the duty cycle of the flyback converter, that is, the amount of time during which the primary winding of transformer 120 (i.e., the left side, as shown in FIG. 1) is connected to the primary side input power source (105), thus storing energy in the primary winding of the transformer.

The secondary side of the flyback converter comprises blocking diode 125 and output capacitor 130. When the switch 115 is closed, the primary winding of the transformer 120 is directly connected to the input voltage source. The primary current and magnetic flux in the transformer 120 increases, thereby storing energy in the transformer. The voltage that is induced in the secondary winding of transformer 120 is negative, so the diode 125 is reverse-biased (i.e., blocking). During this time, the output capacitor 130 supplies energy to the output load. When the switch 115 is opened, on the other hand, the voltage across the primary winding of transformer 120 reverses to try and maintain the primary current. The secondary voltage is positive, thus forward-biasing the diode 125 and allowing current to flow from the transformer 120 to the output load and output capacitor 130. The energy from the transformer core thus recharges the capacitor and supplies power to the secondary system load. The diode 125 may be alternatively substituted with a synchronous rectifying MOSFET to reduce the power dissipation.

As mentioned above, some of the challenges associated with the design of the power converter circuits for operation under the USB-PD standard include the wide output voltage range that is to be produced, as well as the wide input voltage range that will be provided to the converter. Further, a wide PWM duty cycle and switching frequency variation may be needed to cover the whole operating output range. Finally, it may be difficult to achieve the optimal circuit design to minimize transient responses when switching between different voltage output levels.

Thus, according to some embodiments, such as the power converter circuit 100 shown in FIG. 1, an additional switching device, e.g., Switch S1 (150), which may, e.g., be a P-FET, may be used to disconnect the output of the flyback converter from the load under certain output load conditions. During the times that Switch S1 (150) is open, the output load may be instead be provided by a buck converter circuit comprising: a buck controller circuit 135, synchronous rectifying MOSFETs 140/145, inductor 155, and capacitor 160. In other embodiments, one or more of the synchronous rectifying MOSFETs 140/145 may instead be replaced with diodes. Inductor 155 and capacitor 160 behave in their normal role in buck converter circuits, i.e., storing energy in the form of a magnetic field and providing energy to the load, respectively.

As discussed in greater detail below, by varying the switching frequency of MOSFET 140, e.g., via the use of a variable-frequency oscillator, the output voltage of the buck converter may be intelligently controlled, so as to smooth the transitions between the output voltage level of the flyback converter and the lower output voltage that the buck controller is capable of regulating the input voltage down to. In particular, the greater the duty cycle that is achievable by the buck converter, the closer that the output voltage of the buck controller is able to reach to the flyback converter's output voltage, thus smoothing the transition from the higher output voltage level to the lower output voltage level regulated by the buck controller, and vice versa. For example, a buck converter capable of operating at an 87.5% duty cycle may be capable of reaching 87.5% of the input voltage level, and a buck converter capable of operating at a 97.5% duty cycle may be capable of reaching 97.5% of the input voltage level. An ideal buck converter would be able to reach all the way to 100% of the input voltage level, thus allowing for a perfectly smooth transition, but, in practice, due to the required "off time" during each switching cycle, a 100% duty cycle is not obtainable.

Figure 2:
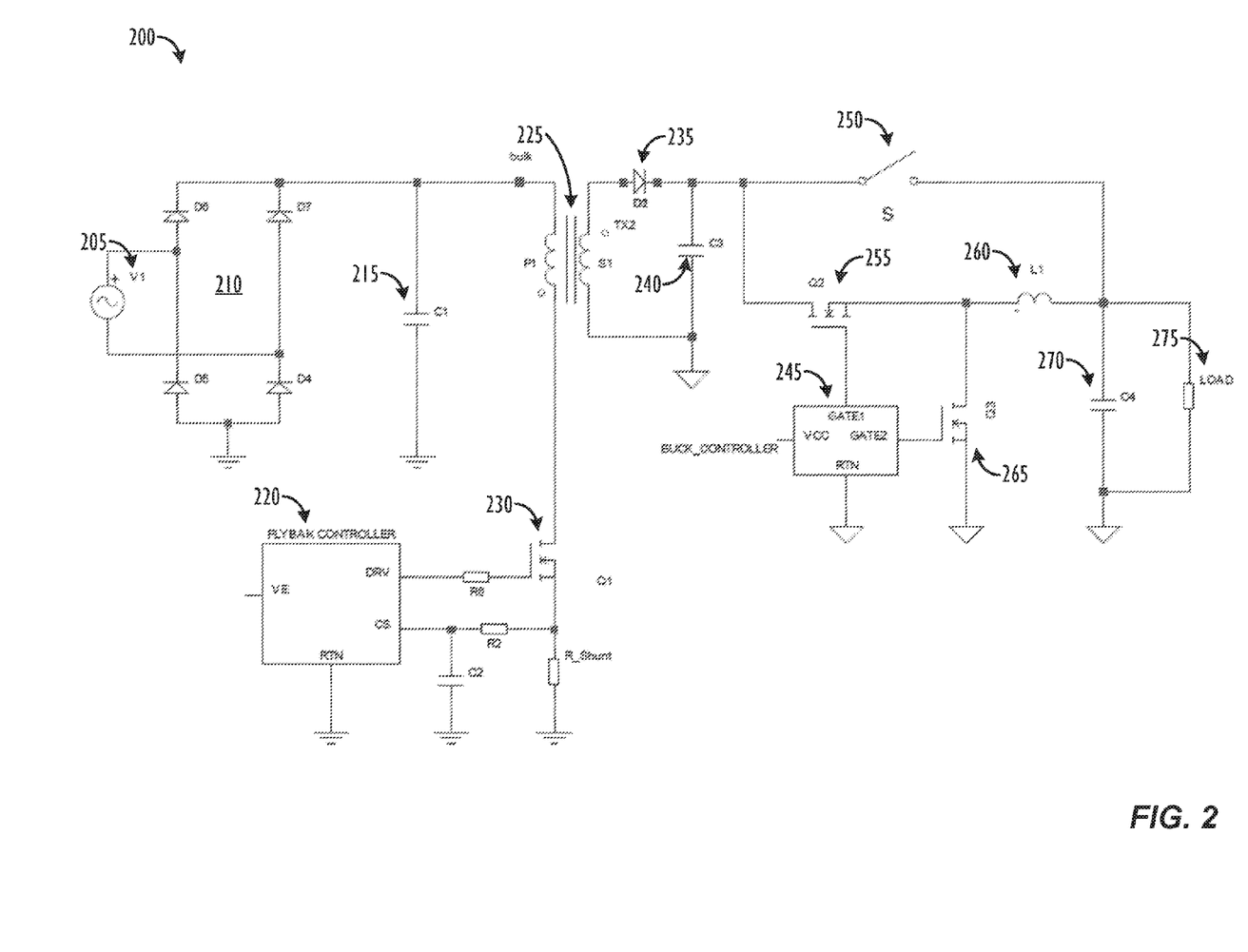
FIG. 2 illustrates a hybrid power converter circuit comprising a flyback converter and a buck converter according to some embodiments, in circuit diagram form.

Turning now to FIG. 2, a hybrid power converter circuit 200 comprising a flyback converter and a buck converter is illustrated in circuit diagram form, according to some embodiments. Circuit 200 presents a more detailed illustration of one potential circuit topology for implementing the power conversion circuit 100 discussed above and illustrated in FIG. 1. As shown in FIG. 2, AC power source 205 is rectified by bridge rectifier 210 comprising diodes D4-D7, which is configured to provide full-wave rectification. As with the circuit of FIG. 1, circuit 200 also comprises flyback controller circuit 220, switching mechanism (Q1) 230, capacitor C1 (215), which is used to store energy from the AC input power source and smooth the rectified AC voltage from the bridge rectifier 210 into an approximate DC voltage source, and transformer 225, which may comprise a primary winding (P1) and a secondary winding (S1). Switching mechanism (Q1) 230 may comprise a P-FET, N-FET, or any other suitable power switch, for controlling the duty cycle of the flyback converter, that is, the amount of time during which the primary winding of transformer 225 (i.e., the left side, as shown in FIG. 2) is connected to the primary side input capacitor (215), thus storing energy in the primary winding of the transformer.

The secondary side of the flyback converter comprises blocking diode (D2) 235 and output capacitor (C3) 240. When the switch 230 is closed, e.g., under the control of the "DRV" signal of the flyback controller circuit 220, the primary winding of the transformer 120 is directly connected to the input voltage source stored in the capacitor (C1) 215. The primary current and magnetic flux in the transformer 225 increases, thereby storing energy in the transformer. The voltage that is induced in the secondary winding of transformer 225 is negative, so the diode 235 is reverse-biased (i.e., blocking). During this time, the output capacitor (C3) 240 supplies energy to the output load. When the switch 230 is opened, on the other hand, the voltage across the primary winding of transformer 225 reverses to try to maintain the primary current. The secondary voltage is positive, thus forward-biasing the diode 235 and allowing current to flow from the transformer 225 to the output load 275 and output capacitor 240. The energy from the transformer core thus recharges the capacitor 240 and supplies power to the secondary system load 275. The diode 235 may be substituted with a synchronous rectifying MOSFET to reduce the power dissipation. Flyback controller circuit 220 may also comprise a current sense (CS) circuit comprising capacitor C2, resistor R2, and shunt resistor (R_Shunt).

Circuit 200 may also comprise and additional switching device, e.g., Switch (S) 250, which may, e.g., be a P-FET, and which may be used to disconnect the output of the flyback converter from the load 275 under certain output load conditions. Switch (S) 250 may also be controlled by a controller circuit (not shown). During the times that Switch (S) 250 is open, the output load 275 may instead be provided by a buck converter circuit comprising: a buck controller circuit 245, synchronous rectifying MOSFETs (Q2) 255/(Q3) 265, inductor (L1) 260, and capacitor (C4) 270. Buck controller circuit 245 may comprise gate drive signals "GATE1" and "GATE2" for driving the aforementioned MOSFETs 255/265. In other embodiments, one or more of the MOSFETs 255/265 may instead be replaced with diodes. Inductor (L1) 260 and capacitor (C4) 270 behave in their normal role in buck converter circuits, i.e., storing energy in the form of a magnetic field and providing energy to the load, respectively.

In any buck converter, there needs to be "down time" in each switching cycle to allow the MOSFET (Q2) 255 to turn on for at least a set amount of time to recharge the bootstrap capacitor, which may be used to provide the gate drive voltage for the top switch, i.e., MOSFET (Q2) 255. MOSFET (Q3) 265 may be used to replace the diode in a traditional buck converter design to keep negative current from flowing through inductor (L1) 260.

As discussed above, during the times that Switch (S) 250 is closed, the output voltage is supplied to the load by the flyback converter circuit, and the output voltage level may also be adjusted by adjusting the switching frequency of the flyback converter circuit. For example, in some embodiments, the flyback converter may be able to provide output voltage at 12V, 15V, or 20V, depending on the switching frequency of MOSFET (Q1) 230.

Figure 3:
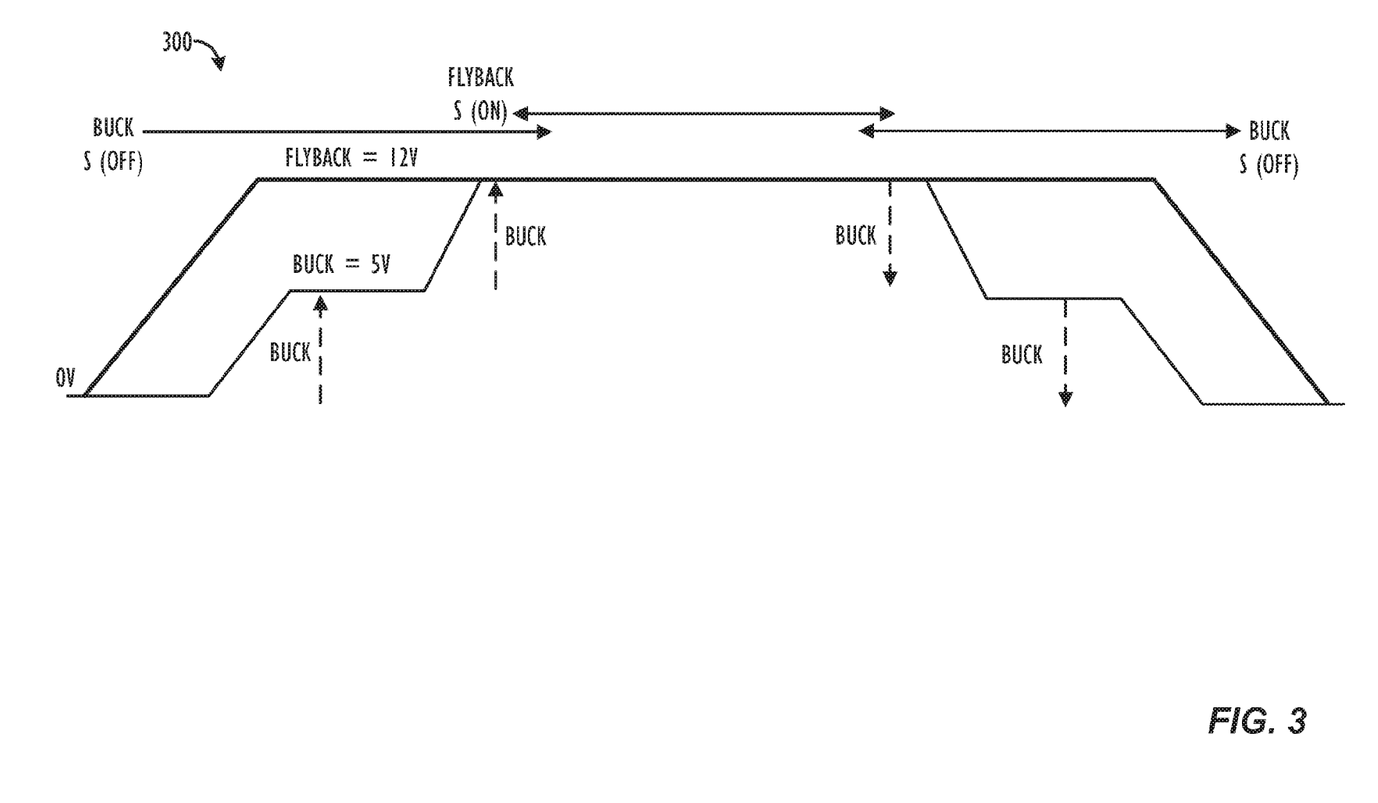
FIG. 3 illustrates exemplary voltage output transitions for an ideal exemplary hybrid power converter circuit comprising a flyback converter and a buck converter according to some embodiments, in line graph form.

Turning now to FIG. 3, exemplary voltage output transitions 300 for an exemplary ideal hybrid power converter circuit comprising a flyback converter and a buck converter are illustrated in line graph form, according to some embodiments. In this example, the flyback converter is configured to provide 12V DC as the input to the buck converter. When the power adapter is initially plugged in to a wall socket, the flyback converter linearly rises to 12V. When the flyback converter reaches the buck controller's under-voltage control level (UVL), the buck controller will 'wake up' and begin to rise along with the flyback converter (but the Switch (S) 250 is still off). Alternately, the buck controller may begin to rise after a pre-programmed delay time. Eventually, both the flyback converter and buck converter will reach steady states. In this example, the steady state of the buck converter may comprise a 5V output level. If no system requirement for a higher voltage output level ever comes, e.g., an electronic device of a first type being connected to the load of the power converter, the buck converter will simply stay at 5V. However, when the system needs a higher voltage, e.g., an electronic device of a second type that requires a 12V input, the buck converter output voltage will start to rise up towards the desired 12V level. This initial sequence of events, comprising the buck converter reaching steady state and then raising up to its maximum output voltage, is illustrated in the left-hand third of FIG. 3. When the buck converter rises up as close as it can to 12V, the buck converter circuit will be disabled, and the Switch (S) 250 may be enabled to connect the flyback converter to the output at the 12V output level, thus minimizing the discontinuities during the transition. The steady state operation of the flyback converter at 12V is illustrated in the middle third of FIG. 3. One potential benefit of letting the flyback converter provide the high power level (i.e., high voltage for the same current) to the output is that a single-stage flyback converter will have higher efficiency than two stage converters, e.g., a flyback converter followed by a buck converter. Thus, the temperature of the device will also not be as hot. On the other hand, the buck converter is much easier to control and has better performance than the flyback converter in general. Therefore, for low power usage, it is preferable for the output voltage to come from the buck converter.

When the system later requires the lower output voltage again, e.g., when an electronic device of a second type, such as an electronic device requiring only a 5V input, is connected to the load of the power converter, the flyback converter may actually stay at 12V once it has reached that steady state, but the Switch (S) 250 may again be turned off so that the buck converter provides the output voltage again. By reversing the sequence of events described above during the "ramping up" of the buck converter, the buck converter may then bring the voltage down from the maximum buck converter voltage (i.e., 12V, in this example) down to 5V again, where it can stay until the system either again requires a higher voltage output level (e.g., due to a device of the first type that requires a 12V input being connected to the power adapter) or until the adapter is unplugged. When the power adapter is unplugged, the voltages of both the flyback converter and buck converter will drop to zero volts. This final sequence of events, comprising the flyback converter being detached from the output load via the opening of Switch (S) 250 and the buck converter returning to its steady state output voltage, before the adapter is eventually turned off, is illustrated in the right-hand third of FIG. 3.

Figure 4:
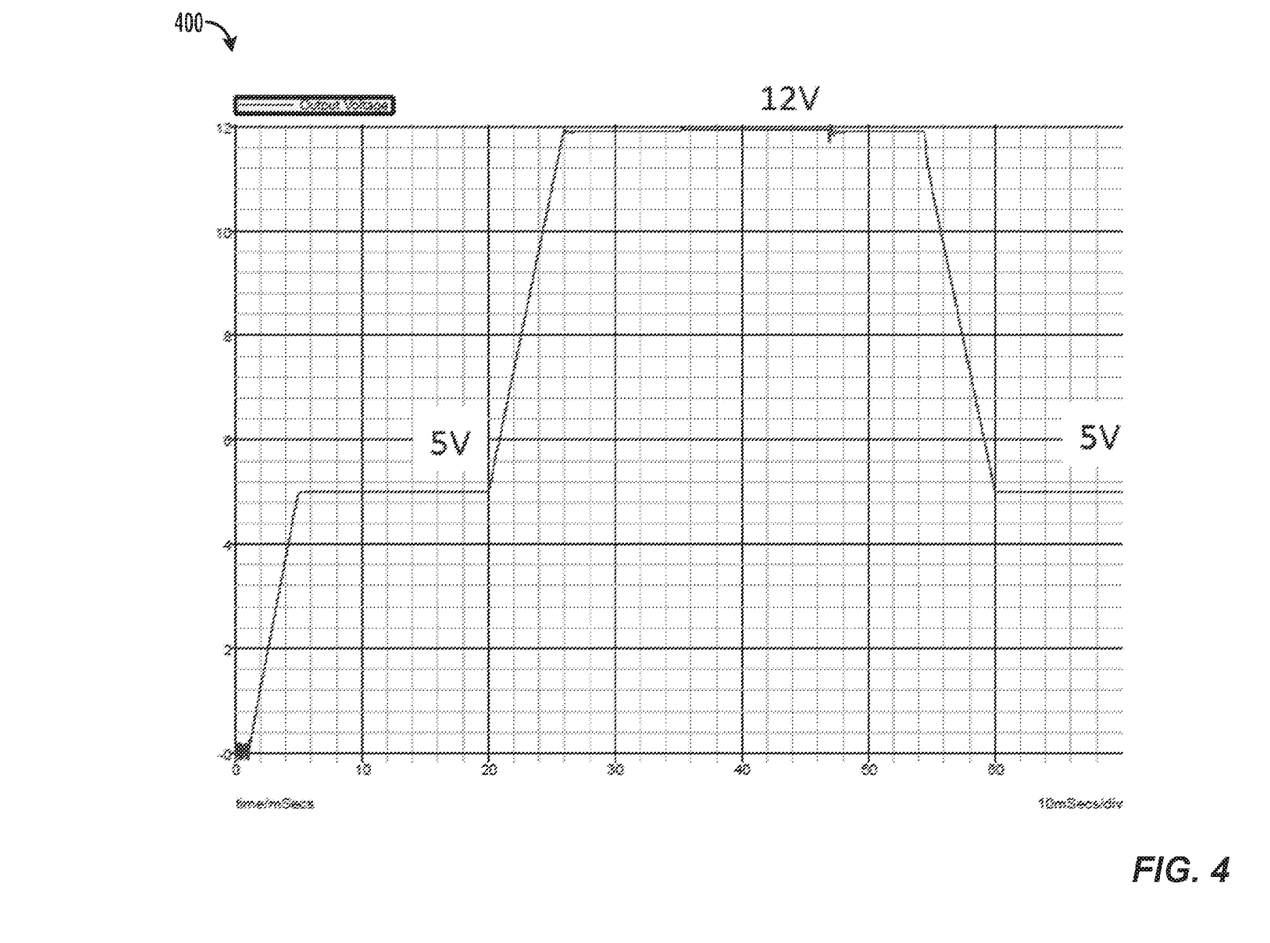
FIG. 4 illustrates exemplary voltage output transitions for an ideal exemplary hybrid power converter circuit comprising a flyback converter and a buck converter, in line graph form.

Turning now to FIG. 4, exemplary voltage output transitions for an ideal exemplary hybrid power converter circuit comprising a flyback converter and a buck converter are illustrated in line graph form (400), according to some embodiments. As shown in FIG. 4, the output voltage level starts out at 0V, and ramps up to 5V by the 5 ms mark on the horizontal axis. From 5 ms to 20 ms, the buck converter output stays at 5V, during which time the buck converter circuit is supplying the output voltage to the load. Next, from 20 ms to 26 ms on the horizontal axis, the switching frequency of the buck converter may continue to be decreased until the output voltage reaches a 12V level. In this so-called "ideal" case, the output of the buck converter is able to go all the way up to its hypothetical input voltage (i.e., 12V in this case). In other words, the "ideal" buck converter is able to operate at a 100% duty cycle (i.e., the MOSFET Q2 255 in FIG. 2 would be in an 'ON' state 100% of the time). As shown in FIG. 4, this results in a smooth and monotonous transition to the 12V output level, with no discernable discontinuities. Finally, the voltage may transition back down to 5V in a monotonous fashion.

In practice, most medium-to high-voltage buck converters are not able to bring their output voltages all the way up to their input voltage. This is because there is a dedicated "off time" in each switching cycle where the bottom MOSFET cannot be turned on. A 250 ns "off time" per switching cycle is typical of these buck regulator circuits, which results in a maximum duty cycle limitation. For example, in a system running at 500 kHz, with a dedicated 250 ns off time per period, the maximum duty cycle is 87.5%. With an input voltage of 12V, then, the output can only reach up to 12V*(0.875)=10.5V.

Figure 5:
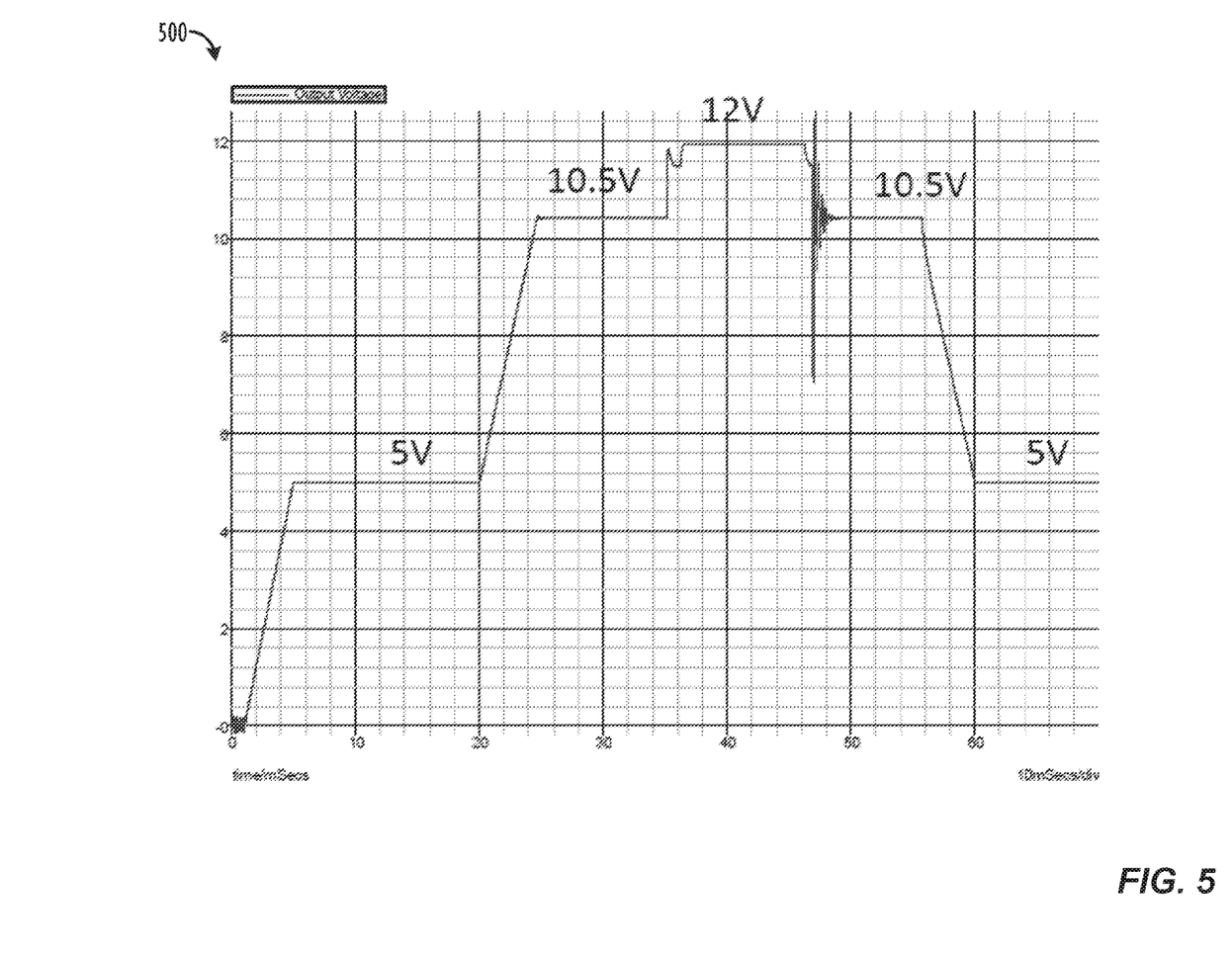
FIG. 5 illustrates exemplary voltage output transitions for a non-ideal exemplary hybrid power converter circuit comprising a flyback converter and a buck converter, in line graph form.

Turning now to FIG. 5, exemplary voltage output transitions for a non-ideal exemplary hybrid power converter circuit comprising a flyback converter and a buck converter are illustrated in line graph form (500). In this configuration, the buck converter is switching at constant switching frequency, e.g., 500 kHz, during normal operation, as well as during output voltage transitions. As shown on the graph 500, the output of the exemplary buck converter stops at 10.5V (i.e., it is limited to a maximum duty cycle of 87.5% since, when operating at 500 kHz, with a dedicated 250 ns off time per period, the maximum duty cycle is calculated to be 87.5%). When the PFET switch (e.g., element 150 in FIG. 1 or element 250 in FIG. 2) turns on, e.g., after 35 ms on the horizontal axis, the output voltage is pulled up to 12V in a way that the transition is not monotonous (see, e.g., the downward dip at 36 ms). Likewise, there are additional discontinuities when the converter transitions back down from 12V to 5V (see, e.g., the discontinuities beginning at the 46 ms mark, wherein the buck converter is not fully functional until the voltage lowers to 10.5V, i.e., the highest output that the buck converter is able to reach given its maximum duty cycle limitations).

Figure 6:
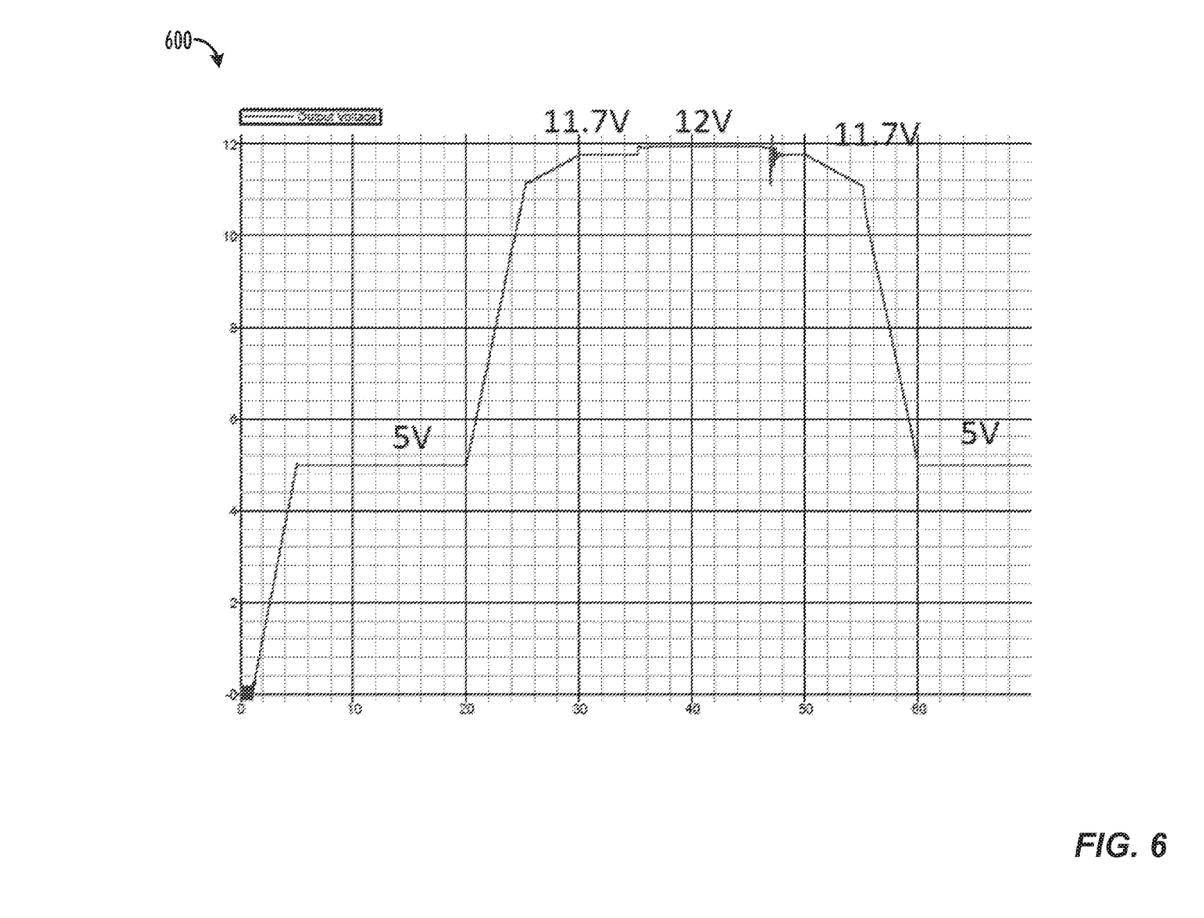
FIG. 6 illustrates exemplary voltage output transitions for an improved exemplary hybrid power converter circuit comprising a flyback converter and a variable frequency buck converter, in line graph form.

Turning now to FIG. 6, exemplary voltage output transitions for an improved exemplary hybrid power converter circuit comprising a flyback converter and a variable frequency buck converter are illustrated in line graph form (600), according to some embodiments. The waveform shows the voltage transition improvements that may be achieved by using a variable frequency buck converter. During the ramping up of the voltage from 5V to 11.7V, the switching frequency of the buck converter may be lowered, e.g., from 500 kHz to 100 kHz. Thus, when the voltage is pulled up to 12V by turning on switch 150/250, there is significant improvement in the voltage transition from that seen in FIG. 5 (in particular, because the buck converter output can achieve 11.7V instead of the 10.5V shown in FIG. 5), and, as a result, the discontinuities are also significantly lessened. During the ramping down of the voltage from 11.7V to 5V, the switching frequency of the buck converter may be increased again, e.g., from 100 kHz to 500 kHz, and the transition cycle may be repeated as necessary. Since the switching frequency of the buck converter is first initiated at 100 kHz during the ramp down, the buck converter takes over the output from 11.7V in FIG. 6, rather than at 10.5V, as shown in FIG. 5. Thus, the output voltage has a smoother, monotonous transition.

In the example of FIG. 6, the buck converter is assumed to be running at 500 kHz during normal operations. Buck converters often operate at high switching frequency such as 500 kHz during normal operation in order to reduce the effect of the magnetic components. Thus, according to some embodiments, the switching frequency of the buck converter is only lowered during the output voltage transitions, so as to increase the maximum output voltage, according to the following exemplary equations: Vout_max=(Ton)/(Ton+Toff)×Vin=(T−Toff_min)/T×Vin=(1−Toff_min×switching frequency)×Vin [where T is the switching cycle and is equal to (Ton+Toff)]. Thus, by reducing the switching frequency, the buck converter may reach its maximum possible buck converter output voltage for the same input voltage.

Figure 7:
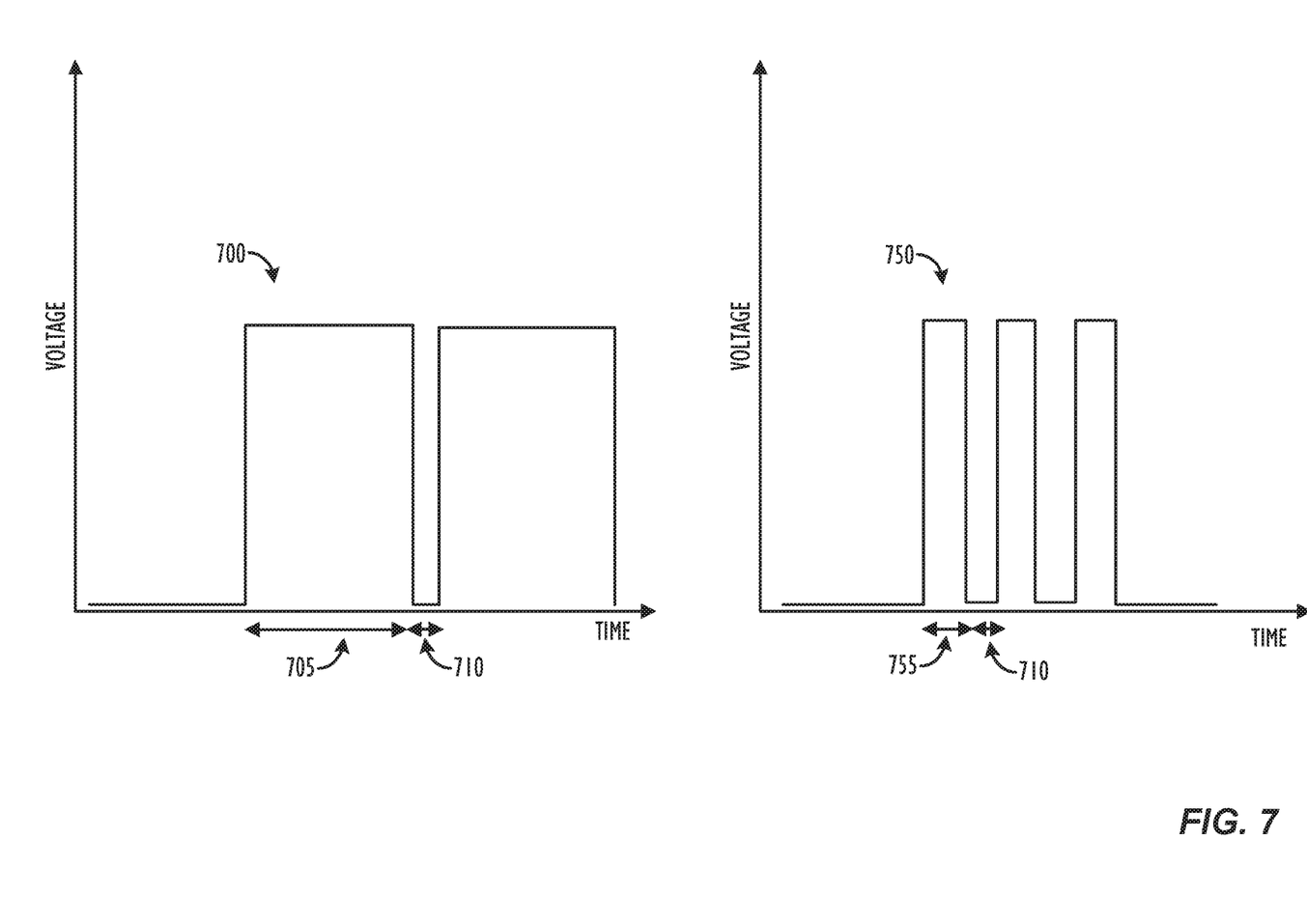
FIG. 7 illustrates the effects of a variable-frequency oscillator in accordance with some embodiments, in line graph form.

Turning now to FIG. 7, the effects of a variable-frequency oscillator are illustrated in line graph form, according to some embodiments. As shown in graph 700, the oscillator is on during time period 705 and is off during "off time" period

710. By contrast, in graph 750, the frequency of oscillation is higher, as evidenced by time period 755 being shorter than time period 705, but the "off time" period 710 in graphs 700 and 750 are the same. This equal "off time" is shown to illustrate the effects of the minimum "off time" in a typical buck converter. As mentioned above, if the buck regulator did not need to have the forced "off time" in switching cycle, then the transition between output voltage levels would be more smooth. By the same token, if the frequency is lowered to a level where the effect of "off time" is lessened, then the output of the buck regulator can get closer to its input voltage, and the voltage transition may also be improved. For example, with a 12V input at 500 kHz with a 250 ns off time, the output can only reach up to 10.5V. However, with a 100 KHz frequency, the output can reach up to 11.7V.

Figure 8:
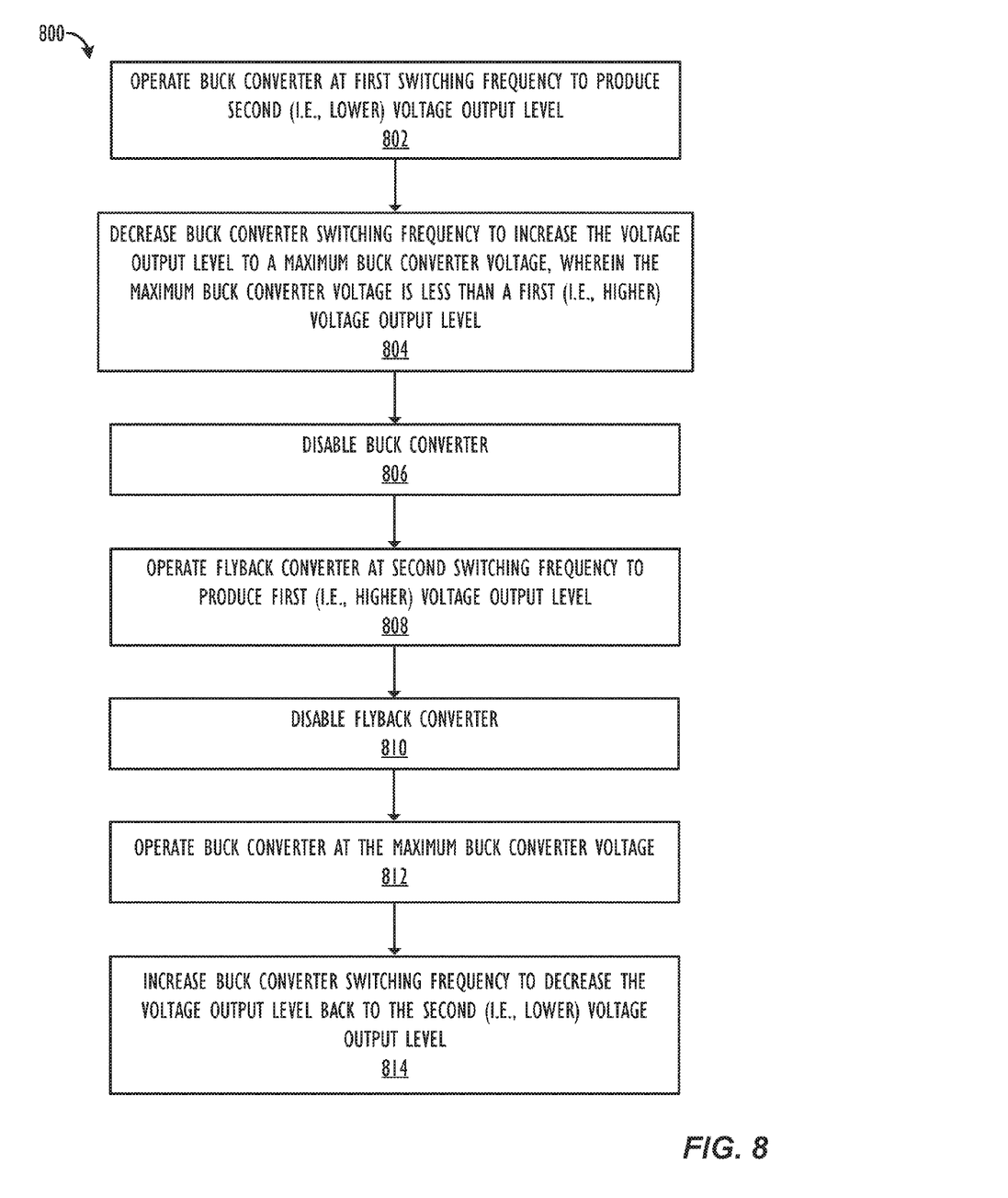
FIG. 8 illustrates a process for performing voltage output transitions in an exemplary hybrid power converter circuit comprising a flyback converter and a buck converter, in flowchart form.

Turning now to FIG. 8, a process 800 for performing voltage output transitions in an exemplary hybrid power converter circuit comprising a flyback converter and a buck converter are illustrated in flowchart form, according to some embodiments. First, assuming that the converter starts out at a second (i.e., lower) voltage output level, e.g., 5V, the power converter circuit will operate the buck converter at a first switching frequency (Step 802). Next, during the ramping up of voltage, the power converter may decrease the buck converter switching frequency in order to increase the voltage output level to a maximum buck converter voltage (Step 804). According to some embodiments, the maximum buck converter voltage is less than a first (i.e., higher) voltage output level, e.g., 12V, due to the aforementioned duty cycle limitations in real-world, i.e., non-ideal, circuits. Once the buck converter has reached its maximum buck converter voltage, the buck converter may be disabled (Step 806), e.g., by closing a switch that connects a flyback converter directly to the output load (Step 808), so that the flyback converter may operate at a second switching frequency to produce the first (i.e., higher) voltage output level. When it is again desired to return to the second (i.e., lower) voltage output level, the power converter may disable the flyback converter (Step 810) and begin supplying voltage to the output load using the maximum buck converter voltage (Step 812). Finally, the power converter may gradually increase the buck converter's switching frequency in order to decrease the voltage output level back to the second (i.e., lower) voltage output level (Step 814).

Figure 9:
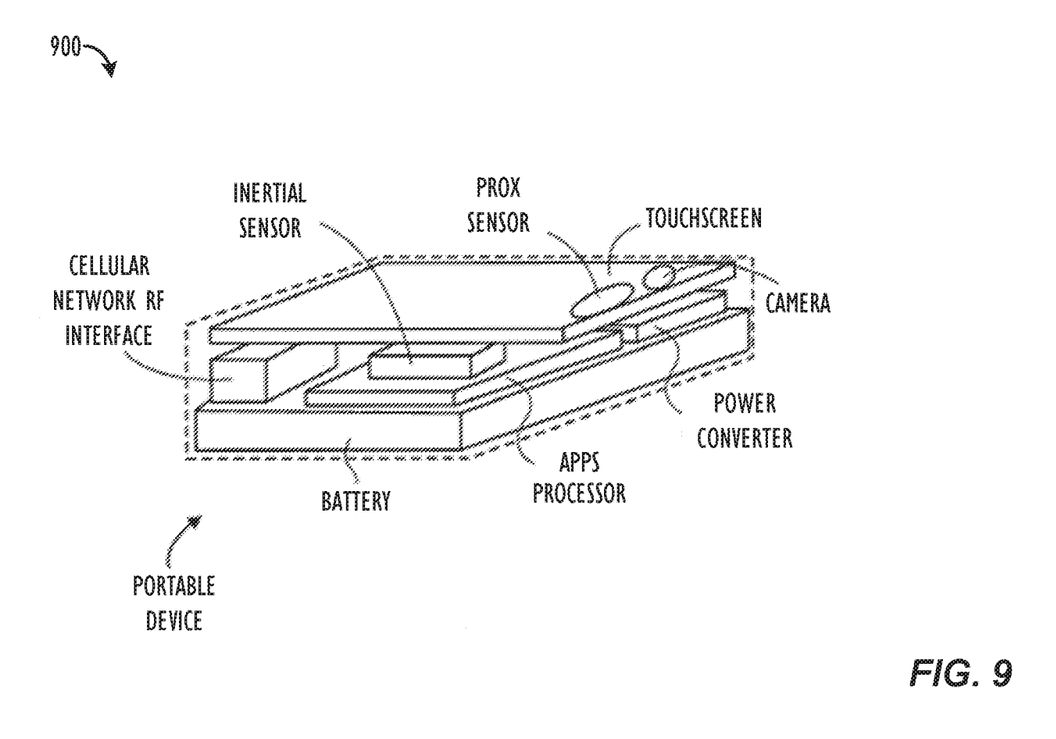
FIG. 9 illustrates an exemplary electronic device with an on-board hybrid power converter circuit comprising a flyback converter and a buck converter, in block diagram form.

Turning now to FIG. 9, an exemplary electronic device (900) with an on-board hybrid power converter circuit comprising a flyback converter and a buck converter is illustrated in block diagram form. The portable device shown has an external or outer housing (shown in dotted lines) in which a number of its constituent sub-systems may be installed, including, in this example, an applications processor, a cellular network RF interface, a digital camera, a touch screen, a proximity sensor and an inertial sensor. These sub-systems may be found in a typical smart phone or tablet computer that also contains a rechargeable battery to power all of the sub-systems shown. In other portable devices, some of these sub-systems may, of course, be absent. One or more of such sub-systems may be connected to be powered by an output node of a hybrid power conversion circuit as described above.

The power conversion circuit in device 900 may be one or more AC-DC voltage regulating down converters (or boost converters), that are connected in parallel to the same output node and are also installed in the housing of the portable device, in order to provide a regulated DC supply voltage to one or more connected sub-systems. An embodiment of the invention smoothes the transitions between output voltage levels that are output to a device such as electronic device 900.

Figure 10:
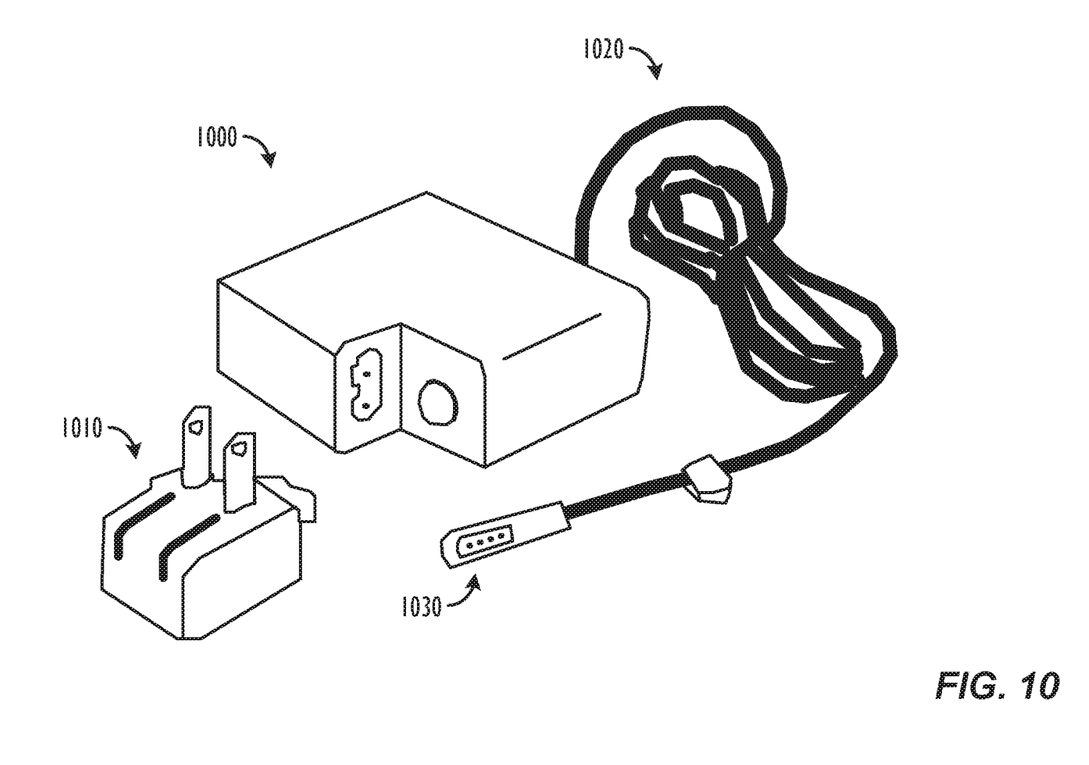
FIG. 10 illustrates an exemplary stand-alone AC-DC adapter with a hybrid power converter circuit comprising a flyback converter and a buck converter.

Turning now to FIG. 10, an exemplary stand-alone AC-DC adapter 1000 with a hybrid power converter circuit comprising a flyback converter and a buck converter is illustrated in block diagram form. In some embodiments, adapter 1000 may also comprise: removable wall plug 1010, extension cord 1020, and/or connection plug 1030 for connecting the stand-along AC-DC adapter 1000 to one or more electronic devices that may require a wide range of output voltages from the adapter.

EXAMPLES

The following examples pertain to additional embodiments.

Example 1 is a power conversion circuit comprising: a first switching power converter for supplying a first output voltage to a load; and a second switching power converter coupled to an output of the first power converter for supplying a second output voltage lower than the first output voltage to the load, wherein a switching frequency of the second switching power converter is increased during transitions from the first output voltage to the second output voltage, wherein the switching frequency of the second switching power converter is decreased during transitions from the second output voltage to the first output voltage, and wherein the first output voltage is greater than the second output voltage.

Example 2 includes the subject matter of example 1, wherein the first switching power converter comprises a flyback converter.

Example 3 includes the subject matter of example 1, wherein the second switching power converter comprises a buck converter.

Example 4 includes the subject matter of example 1, wherein the second switching power converter is coupled to the output of the first power converter via a switch.

Example 5 includes the subject matter of example 1, wherein the transition from the first output voltage to the second output voltage is configured to occur in response to a first type of device being disconnected from the load and a second type of device being connected to the load.

Example 6 includes the subject matter of example 5, wherein the transition from the second output voltage to the first output voltage is configured to occur in response to the second type of device being disconnected from the load and the first type of device being connected to the load.

Example 7 includes the subject matter of example 1, wherein increasing and decreasing the switching frequency of the second switching power converter smoothes transitions between the first and second output voltages.

Example 8 is a power conversion circuit comprising: a flyback converter configured to produce a first output voltage at an output; and a buck converter configured to produce a second output voltage lower than the first output voltage at the output, wherein: the flyback converter is coupled to a load along a first path by the buck converter and is coupled to the load along a second path by a switch, the buck converter comprises an input coupled to the output of the flyback converter and an output coupled to the load, the switch is configured to bypass the buck converter and supply the first output voltage to the load when in a closed position, the switch is configured to allow the buck converter to supply the second output voltage to the load when in an opened position, the switching frequency of a switching device in the buck converter is decreased during a transition from the second output voltage to the first output voltage, and the switching frequency of the switching device in the buck converter is increased during a transition from the first output voltage to the second output voltage to smooth a transition between the first and second output voltages.

Example 9 includes the subject matter of example 8, wherein the first output voltage is 12 V.

Example 10 includes the subject matter of example 8, wherein the second output voltage is 5V.

Example 11 includes the subject matter of example 8, wherein the buck converter comprises a synchronous buck converter.

Example 12 includes the subject matter of example 11, wherein the synchronous buck converter comprises a plurality of MOSFETs.

Example 13 includes the subject matter of example 8, wherein the switching device in the buck converter achieves a maximum duty cycle during the transition from the first output voltage to the second output voltage.

Example 14 includes the subject matter of example 8, wherein the switching device comprises a variable-frequency oscillator.

Example 15 includes the subject matter of example 8, wherein the transition between the first and second output voltages is monotonic.

Example 16 is a method comprising to improve voltage transitions in a power conversion circuit comprising a flyback converter for producing a first output voltage at an output, and a buck converter for producing a second output voltage lower than the first output voltage at the output, wherein the flyback converter is coupled to a load along a first path by the buck converter, and wherein the flyback converter is coupled to the load along a second path by a switch, the method comprising: opening the switch to allow the buck converter to supply the second output voltage to the load; decreasing a switching frequency of a switching device in the buck converter to cause the buck converter to smooth a transition between supplying the second output voltage to the load to supplying a first maximum buck converter voltage to the load; closing the switch to allow the flyback converter to bypass the buck converter and supply the first output voltage to the load; opening the switch to allow the buck converter to supply the second output voltage to the load; and increasing the switching frequency of the switching device in the buck converter to cause the buck converter to smooth a transition between supplying the first maximum buck converter voltage to the load to supplying the second output voltage to the load.

Example 17 includes the subject matter of example 16, wherein the first maximum buck converter voltage is greater than the second output voltage but less than the first output voltage.

Example 18 includes the subject matter of example 16, wherein the transition between supplying the second output voltage to the load to supplying the first maximum buck converter voltage to the load is monotonic.

Example 19 includes the subject matter of example 16, wherein the buck converter comprises a synchronous buck converter.

Example 20 includes the subject matter of example 16, wherein the switching device in the buck converter achieves a maximum duty cycle during the transition between supplying the first maximum buck converter voltage to the load to supplying the second output voltage to the load.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled.

The invention claimed is:

1. A power conversion circuit comprising:
a first switching power converter producing a first output voltage;
a second switching power converter producing a second output voltage,
wherein the first switching power converter is coupled to a load along a first path by the second switching power converter and coupled to the load along a second path by a switch,
wherein responsive to a transition between supplying the second output voltage to the load to supplying the first output voltage to the load, the switch is opened and a switching frequency of the second switching power converter is decreased,
wherein responsive to the second output voltage reaching a first maximum voltage, the switch is closed to allow the first switching power converter to bypass the second switching power converter and supply the first output voltage to the load, and
wherein responsive to a transition between supplying the first output voltage to the load to supplying the second output voltage to the load, the switch is opened and the switching frequency of the second switching power converter is increased.

2. The power conversion circuit of claim 1, wherein the first switching power converter comprises a flyback converter.

3. The power conversion circuit of claim 1, wherein the second switching power converter comprises a buck converter.

4. The power conversion circuit of claim 1, wherein the second switching power converter is coupled to the output of the first power converter via a switch.

5. The power conversion circuit of claim 1, wherein the transition between supplying the first output voltage and supplying the second output voltage is configured to occur in response to a first type of device being disconnected from the load and a second type of device being connected to the load.

6. The power conversion circuit of claim 5, wherein the transition between supplying the second output voltage and supplying the first output voltage is configured to occur in response to the second type of device being disconnected from the load and the first type of device being connected to the load.

7. A power conversion circuit comprising:
a flyback converter configured to produce a first output voltage; and
a buck converter configured to produce a second output voltage lower than the first output voltage,
wherein the flyback converter is coupled to a load along a first path by the buck converter and is coupled to the load along a second path by a switch,
wherein responsive to a transition between supplying the second output voltage to the load and supplying the first output voltage to the load, the switch is configured to open and a switching frequency of the second switching power converter is decreased, wherein responsive to the second output voltage reaching a first maximum voltage, the switch is configured to close to allow the first switching power converter to bypass the second switching power converter and supply the first output voltage to the load, and wherein responsive to a transition between supplying the first output voltage to the load and supplying the second output voltage to the load, the switch is configured to open and the switching frequency of the second switching power converter is increased.

8. The power conversion circuit of claim 7, wherein the first output voltage is 12V.

9. The power conversion circuit of claim 7, wherein the second output voltage is 5V.

10. The power conversion circuit of claim 7, wherein the buck converter comprises a synchronous buck converter.

11. The power conversion circuit of claim 10, wherein the synchronous buck converter comprises a plurality of MOSFETs.

12. The power conversion circuit of claim 7, wherein the switching device in the buck converter achieves a maximum duty cycle during the transition between the first output voltage and the second output voltage.

13. The power conversion circuit of claim 7, wherein the switching frequency of the second switching power converter is adjusted by using a variable-frequency oscillator.

14. The power conversion circuit of claim 7, wherein the transition between the first and second output voltages is monotonic.

15. A method to improve voltage transitions in a power conversion circuit comprising a flyback converter for producing a first output voltage at an output, and a buck converter for producing a second output voltage lower than the first output voltage at the output, wherein the flyback converter is coupled to a load along a first path by the buck converter, and wherein the flyback converter is coupled to the load along a second path by a switch, the method comprising:
- opening the switch to allow the buck converter to supply the second output voltage to the load;
- decreasing a switching frequency of a switching device in the buck converter to cause the buck converter to transition between supplying the second output voltage to the load and supplying a first maximum buck converter voltage to the load;
- closing the switch to allow the flyback converter to bypass the buck converter and supply the first output voltage to the load;
- opening the switch to allow the buck converter to supply the second output voltage to the load; and
- increasing the switching frequency of the switching device in the buck converter to cause the buck converter to transition between supplying the first maximum buck converter voltage to the load and supplying the second output voltage to the load.

16. The method of claim 15, wherein the first maximum buck converter voltage is greater than the second output voltage but less than the first output voltage.

17. The method of claim 15, wherein the transition between supplying the second output voltage to the load and supplying the first maximum buck converter voltage to the load is monotonic.

18. The method of claim 15, wherein the buck converter comprises a synchronous buck converter.

19. The method of claim 15, wherein the switching device in the buck converter achieves a maximum duty cycle during the transition between supplying the first maximum buck converter voltage to the load and supplying the second output voltage to the load.

20. The method of claim 15, further comprising adjusting the switching frequency of the switching device in the buck converter responsive to a first type of device being disconnected from the load and a second type of device being connected to the load.

* * * * *